United States Patent
Hoshikawa et al.

(10) Patent No.: US 9,011,012 B2
(45) Date of Patent: Apr. 21, 2015

(54) BEARING CAP AND BEARING CAP ASSEMBLY

(75) Inventors: Hiroaki Hoshikawa, Isehara (JP); Kazuki Arima, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/821,730

(22) PCT Filed: Nov. 14, 2011

(86) PCT No.: PCT/JP2011/076193
§ 371 (c)(1),
(2), (4) Date: Mar. 8, 2013

(87) PCT Pub. No.: WO2012/090605
PCT Pub. Date: Jul. 5, 2012

(65) Prior Publication Data
US 2013/0163906 A1 Jun. 27, 2013

(30) Foreign Application Priority Data
Dec. 27, 2010 (JP) ................................ 2010-290315

(51) Int. Cl.
*F16C 35/00* (2006.01)
*F16C 35/02* (2006.01)
*F16C 9/02* (2006.01)
*F02F 7/00* (2006.01)

(52) U.S. Cl.
CPC . *F16C 35/02* (2013.01); *F16C 9/02* (2013.01); *F02F 7/0053* (2013.01)

(58) Field of Classification Search
CPC ........... F16C 9/02; F16C 35/02; F02F 7/0053
USPC ......................... 384/429, 430, 432, 433, 434; 123/195 R; 74/579 E, 595
See application file for complete search history.

(56) References Cited

U.S. PATENT DOCUMENTS

| | | | |
|---|---|---|---|
| 2,997,347 A * | 8/1961 | Bauer | 384/432 |
| 4,209,209 A * | 6/1980 | Stark | 384/432 |
| 4,693,216 A * | 9/1987 | Ampferer et al. | 123/195 R |
| 5,203,854 A * | 4/1993 | Nilsson et al. | 384/433 |
| 5,743,230 A * | 4/1998 | Yamazaki et al. | 123/195 H |

(Continued)

FOREIGN PATENT DOCUMENTS

| | | |
|---|---|---|
| JP | 62-89521 U | 6/1987 |
| JP | 3-62216 A | 3/1991 |

(Continued)

*Primary Examiner* — Thomas R. Hannon
*Assistant Examiner* — Adam D Rogers
(74) *Attorney, Agent, or Firm* — Foley & Lardner LLP

(57) ABSTRACT

A bearing cap (11) fastened to a bulkhead (2) of a cylinder block (1) by bolts to support a crankshaft. A pair of protruding parts (25, 26) that enlarge a joint surface (12) between the bearing cap (11) and the bulkhead (2) in a transverse direction of the crankshaft are formed respectively in a pair of side surfaces (33, 34). A pair of reinforcing parts (35, 36) are positioned between a top surface (19) and the pair of protruding parts (25, 26), protrude from the pair of side surfaces (33, 34) in the transverse direction of the crankshaft, and have a protrusion length that is smaller than that of the pair of protruding parts (25, 26). The stress on the joint portion between the bearing cap (11) and the bulkhead (2) generated by the crankshaft during operation of the internal combustion engine is thereby reduced.

8 Claims, 9 Drawing Sheets

(56) References Cited

U.S. PATENT DOCUMENTS

| | | | |
|---|---|---|---|
| 6,231,240 B1 * | 5/2001 | Brenker et al. | 384/432 |
| 6,357,412 B1 * | 3/2002 | Menzl | 123/195 H |
| 6,926,444 B2 * | 8/2005 | Rengmyr | 384/433 |
| 7,695,823 B2 * | 4/2010 | Wakade | 428/548 |
| 8,690,440 B2 * | 4/2014 | Mochida | 384/432 |
| 2014/0133791 A1 * | 5/2014 | Vincent et al. | 384/432 |

FOREIGN PATENT DOCUMENTS

| | | |
|---|---|---|
| JP | 4-50509 A | 2/1992 |
| JP | 4-68215 U | 6/1992 |

* cited by examiner

US 9,011,012 B2

BEARING CAP AND BEARING CAP ASSEMBLY

FIELD OF THE INVENTION

This invention relates to a bearing cap that supports a crankshaft of an internal combustion engine, and a bearing cap assembly in the form of a ladder frame or the like having bearing caps as components.

BACKGROUND OF THE INVENTION

A crankshaft of an internal combustion engine is supported by, for example, a bulkhead formed on a cylinder block and a bearing cap fixed to the bulkhead.

JP 93-062216U, published in 1991 by the Japan Patent Office, proposes a bearing structure in which a bearing cap is fitted into a recessed part formed on a bulkhead and fixed to the bulkhead with bolts. In this bearing structure, chamfers are formed at both ends of the bearing cap in a transverse direction of a crankshaft and grooves are formed at both corners of the recessed part to oppose the chamfers, so that the bearing cap does not cause stress concentration at both ends of the recessed part of the bulkhead during operation of the internal combustion engine.

SUMMARY OF THE INVENTION

By providing the chamfers at both ends of the bearing cap, spaces are formed between the grooves and the chamfers, and thus concentration of stress at these portions can be avoided. According to this bearing structure, however, since the contact surface area between the bearing cap and the bulkhead is reduced due to the chamfers, an overall increase in stress on a joint portion between the bearing cap and the bulkhead generated by the crankshaft during operation of the internal combustion engine is inevitable.

It is therefore an object of this invention to reduce the stress on the joint portion between the bearing cap and the bulkhead generated by the crankshaft during operation of the internal combustion engine without impairing the rigidity of the bearing cap.

In order to achieve the above object, this invention provides bearing cap fixed to a bulkhead of a cylinder block by bolts and supporting a crankshaft so as to be free to rotate. The bearing cap comprises a joint surface with the bulkhead, a top surface that is positioned on an opposite side of the joint surface, and a pair of side surfaces that connect the joint surface and the top surface. The bearing cap further comprises a pair of protruding parts that protrude respectively from the pair of side surfaces to enlarge the joint surface in a transverse direction of the crankshaft, and a pair of reinforcing parts located between the pair of protruding parts and the top surface, the pair of reinforcing parts protruding from the pair of side surfaces in the transverse direction of the crankshaft and having a protrusion length that is smaller than that of the pair of protruding parts.

The details as well as other features and advantages of this invention are set forth in the remainder of the specification and are shown in the accompanying drawings.

DESCRIPTION OF THE PREFERRED EMBODIMENTS

Figure 1:
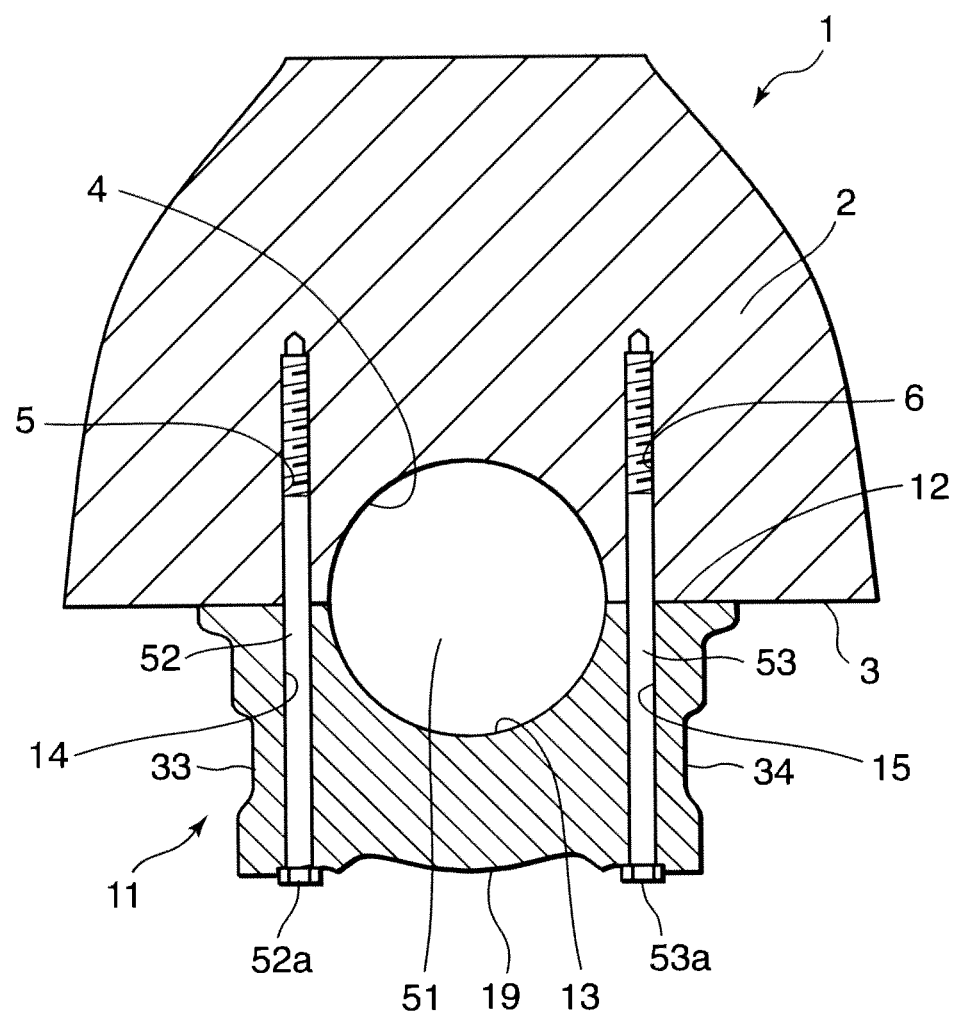
FIG. 1 is a schematic transverse cross-sectional view of a cylinder block of an internal combustion engine illustrating a bearing cap according to a first embodiment of this invention that is attached to a bulkhead.

Referring to FIG. 1 of the drawings, a bearing that supports a crankshaft of a reciprocating internal combustion engine comprises a bulkhead 2 formed on a cylinder block 1 of the internal combustion engine and a bearing cap 11 fixed to the bulkhead 2 by bolts 52 and 53.

The main body of the cylinder block 1 including the bulkhead 2 is formed from an aluminum alloy or aluminum material that is lighter than ferrous materials in order to reduce the weight. The bulkhead 2 functions as a partition wall dividing a plurality of cylinders within the cylinder block 1.

In the operating state of the internal combustion engine, the bulkhead 2 constitutes a wall surface in a vertical direction. A bottom end 3 of the bulkhead 2 forms a horizontal straight line, and a semi-circular notch 4 is formed at an approximate center of the bottom end 3. The cylinder block 1 is, for example, a cylinder block for an in-line multi-cylinder engine in which a plurality of cylinders are aligned in one line.

The bearing cap 11 constituted by a ferrous material such as cast iron is fixed to the bulkhead 2. The bearing cap 11 has a rectangular thick board shape. A semi-circular notch 13 corresponding to the notch 4 is formed on a joint surface 12 of the bearing cap 11 with the bulkhead 2.

The bearing cap 11 is fixed to the bottom surface 3 of the bulkhead 2 at a position in which the notches 4 and 13 face each other to form a circular bearing hole 51. The crankshaft is supported so as to be free to rotate with a journal bearing placed in the bearing hole 51 via lubricating oil supplied to the journal bearing.

The bearing cap 11 is fixed to the bulkhead 2 by a pair of bolts 52 and 53. In order to fix the bearing cap 11 to the bulkhead 2, bolt insertion holes 14 and 15 are formed on both sides of the notch 13 of the bearing cap 11, and screw holes 5 and 6 into which the bolts 52 and 53 are threaded are formed in the bulkhead 2.

By inserting the bolt 52 into the bolt insertion hole 14 and tightening it into the screw hole 5 and inserting the bolt 53 into the bolt insertion hole 15 and tightening it into the screw hole 6, the bearing cap 11 is fixed to the bottom end 3 of the bulkhead 2.

The bearing cap 11 has the joint surface 12 with the bulkhead 2, a top surface 19 on an opposite side of the joint surface 12, or in other words on the bottom side in FIG. 1, and a pair of side surfaces 33 and 34 that connect the joint surface 12 and the top surface 19. A head part 52a of the bolt 52 and a head part 53a of the bolt 53 are in contact with the top surface 19 from below.

Figure 2:
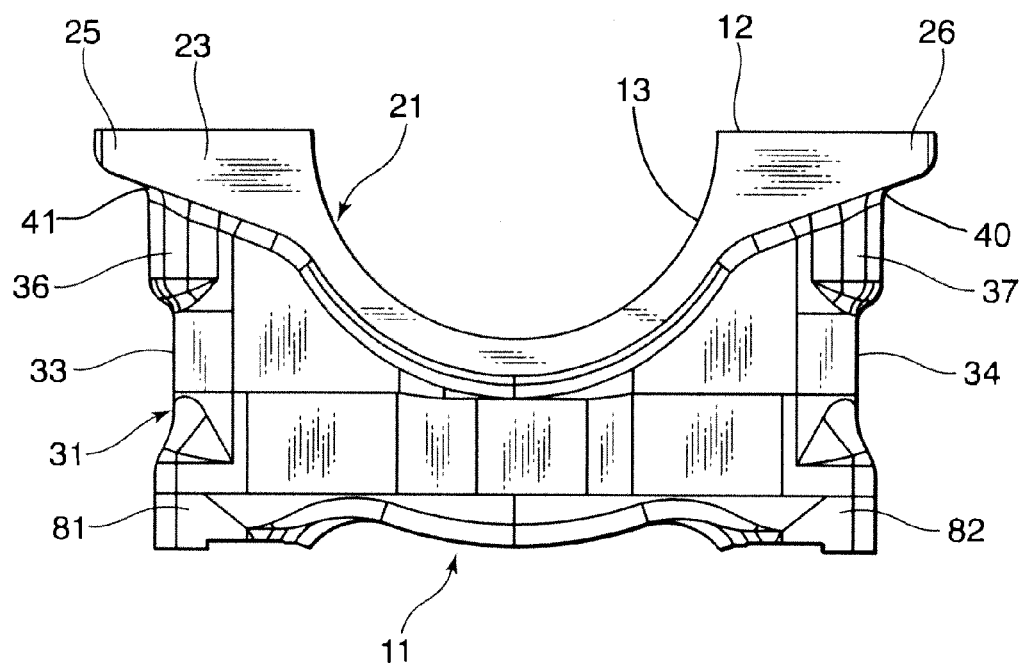
FIG. 2 is a front view of the bearing cap.

Referring to FIG. 2, the bearing cap 11 comprises a half cylindrical area 21 that forms the notch 13 and a trapezoidal area 31 that is continuous with the bottom of the cylindrical area 21, and is formed with overall right-left symmetry.

Protruding parts 25 and 26 that protrude largely from the side surfaces 33 and 34 in the horizontal direction orthogonal to the crankshaft, or in other words in the right-left direction in FIG. 2, are formed in the cylindrical area 21. The dimension of the joint surface 12 corresponding to the protruding parts 25 and 26 in an axial direction of the crankshaft is the same as that of the other part of the joint surface 12. The protruding parts 25 and 26 enlarge the joint surface 12 of the bearing cap 11 with the bulkhead 2 in a horizontal direction perpendicular to the axial direction, and function to increase the joint surface area between the bearing cap 11 and the bulkhead 2.

Enlarging the joint surface area between the bearing cap 11 and the bulkhead 2 has an effect of decreasing a contact pressure therebetween and reducing stress on the bulkhead 2 caused by the bearing cap 11.

Reinforcing parts 36 and 37 are formed in the trapezoidal area 31 at positions on the top surface 19 side of the protruding parts 25 and 26. The reinforcing parts 36 and 37 protrude from the side surfaces 33 and 34 in the same direction as the protruding parts 25 and 26. A protrusion length of the reinforcing parts 36 and 37 is set to be smaller than a protrusion length of the protruding parts 25 and 26. Herein, the protrusion length means the amount of protrusion in the horizontal direction from the side surfaces 33 and 34. The reinforcing parts 36 and 37 function to increase a rigidity of the protruding parts 25 and 26.

The protruding part 25 positioned on the left side in FIG. 2 decreases in thickness toward the distal end direction, or in other words in a direction away from the crankshaft. The protruding part 26 positioned on the right side in FIG. 2 also decreases in thickness toward a distal end, or in other words in a direction away from the crankshaft. In accordance with the decrease in the thickness, the bottom surfaces of the protruding parts 25 and 26 are inclined. By changing the thickness of the protruding parts 25 and 26 in this way, an increase in the weight of the bearing cap 11 due to formation of the protruding parts 25 and 26 can be suppressed. The reinforcing parts 36 and 37 are formed as a part of the trapezoidal area 31, and are connected to the inclined lower surfaces of the protruding parts 25 and 26.

By forming the reinforcing parts 36 and 37 on the side surfaces 33 and 34 of the bearing cap 11, the protruding parts 25 and 26 that have a large protrusion length are provided with sufficient rigidity.

A pair of rounded portions 40 and 41 is formed between the pair of protruding parts 25 and 26 and the pair of reinforcing parts 36 and 37, the pair of rounded portions 40 and 41 protruding from the pair of side surfaces 33 and 34 in the transverse direction of the crankshaft and having a protrusion length that is smaller than the protrusion length of the pair of protruding parts 25 and 26 and greater than the protrusion length of the pair of reinforcing parts 36 and 37.

Figure 3:
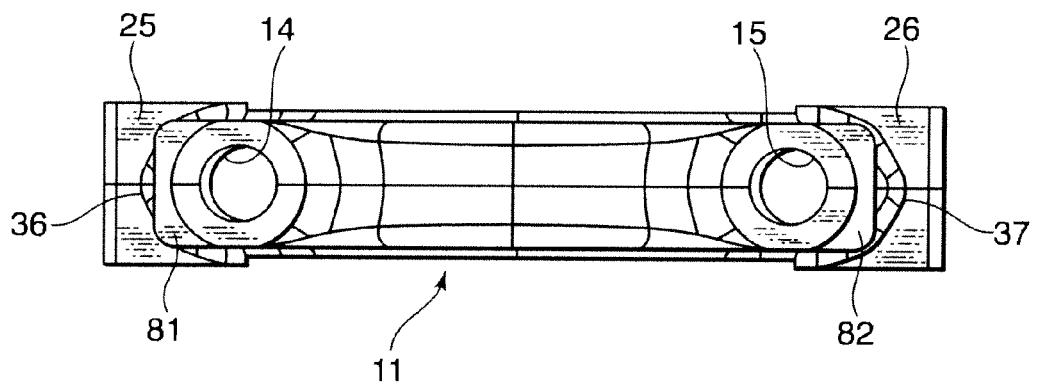
FIG. 3 is a plan view of the bearing cap when viewed from the below.

Referring to FIG. 3, auxiliary reinforcing parts 81 and 82 that protrude from the side surfaces 33 and 34 in the right-left direction of FIG. 3 are formed in the trapezoidal area 31 of the bearing cap 11 so as to enlarge the top surface 19. The auxiliary reinforcing parts 81 and 82 also function to increase the rigidity of the bearing cap 11.

In this way, in the bearing cap 11, the stress on the bulkhead 2 from the crankshaft via the hearing cap 11 is reduced by the protruding parts 25 and 26 that protrude from the side surfaces 33 and 34 in the horizontal direction, and the reinforcing parts 36 and 37 that protrude from the side surfaces 33 and 34 in the same direction by a smaller protrusion length support the protruding parts 25 and 26 to secure the rigidity of the bearing cap 11.

The bearing cap 11 constructed as described above reduces stress on the hearing cap 11 and the bulkhead 2 generated by the crankshaft during operation of the internal combustion engine.

Referring to FIGS. 4 to 7, a second embodiment of this invention will be explained.

This embodiment relates to a bearing cap assembly. The bearing cap assembly comprises a plurality of the bearing caps 11 and a ladder frame 71 that serves as a bearing cap retaining member. The ladder frame 71 is formed from a metal material such as an aluminum alloy that is lighter than the bearing cap 11 material, i.e., a ferrous material and has a lower melting point than that of the bearing cap 11. The bearing cap 11 is cast into the ladder frame 71 to constitute the integral bearing cap assembly.

Figure 5:
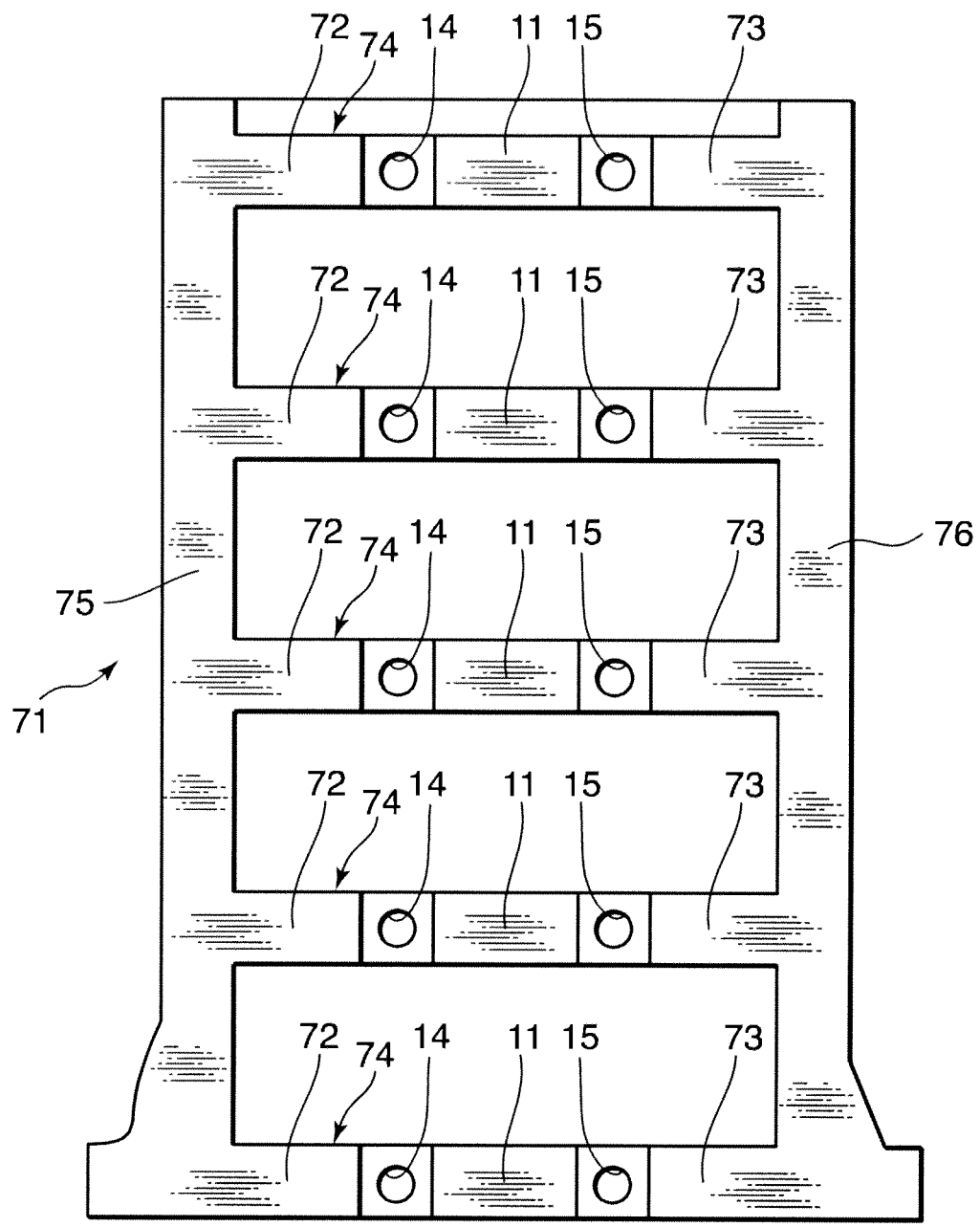
FIG. 5 is a plan view of the bearing cap assembly according to the second embodiment of this invention.

Referring to FIG. 5, the ladder frame 71 is adapted to be used for an in-line four-cylinder internal combustion engine. The ladder frame 71 forms a ladder shape in which five crossbar members 74 arranged in parallel are joined at both ends thereof to a pair of beam members 75 and 76. The crossbar members 74 are disposed directly under the bulkhead formed in the cylinder block. Application of the bearing cap assembly having the ladder frame 71 constructed in this way is not limited to an in-line four-cylinder internal combustion engine. It can be applied to an internal combustion engine having any number of cylinders by changing the number of crossbar members 74.

Figure 4:
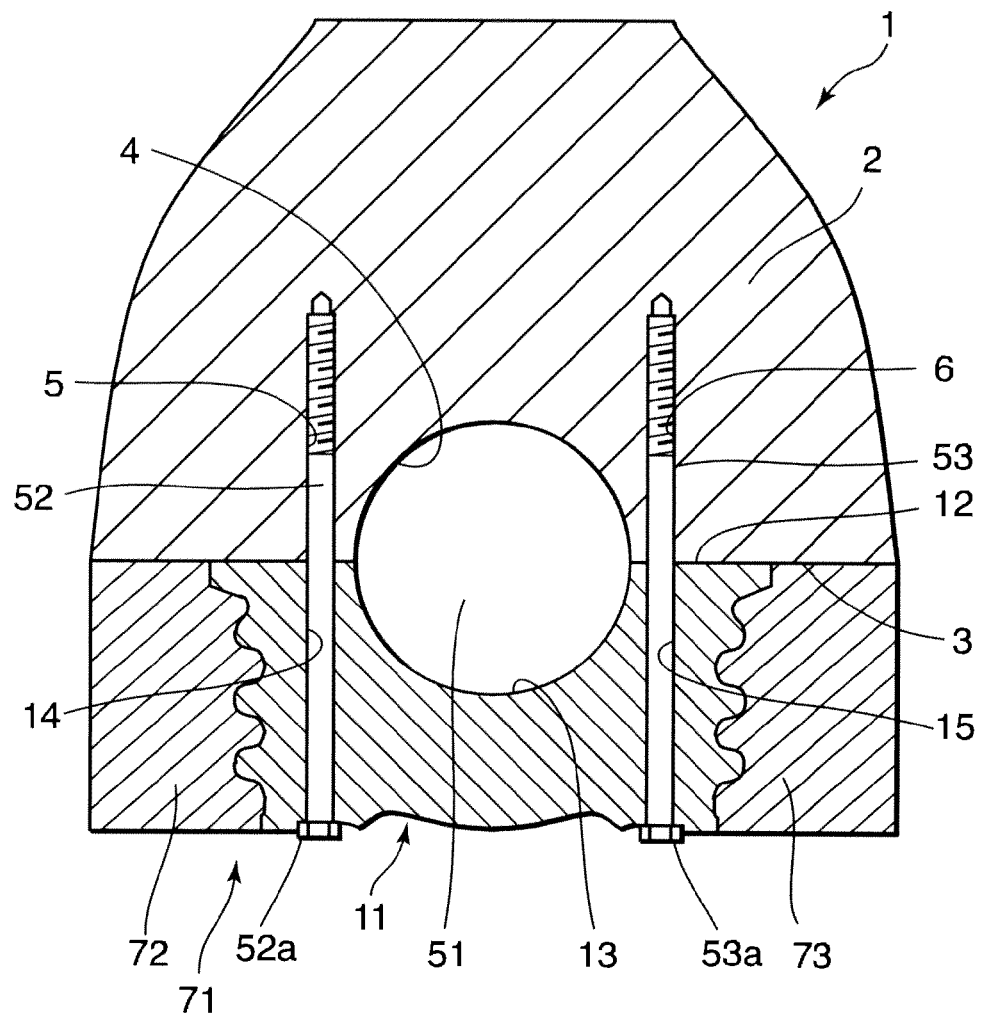
FIG. 4 is a schematic transverse cross-sectional view of a cylinder block of an internal combustion engine illustrating a bearing cap assembly comprising bearing caps and a ladder frame according to a second embodiment of this invention in a state attached to a bulkhead.

Referring to FIG. 4, the bearing cap 11 is cast between cap extending parts 72 and 73. The cap extending parts 72 and 73 are provided as a part of the crossbar member 74 and are positioned on the outside of the bearing cap 11 in the horizontal direction. The cap extending parts 72 and 73 are formed from aluminum alloy similar to the other areas of the ladder frame 71. By casting the bearing cap 11 between the cap extending parts 72 and 73, an integral thick board-shaped crossbar member 74 is formed.

Referring again to FIG. 5, the pair of beam members 75 and 76 is also formed from aluminum alloy. Five bearing caps 11 are cast into the ladder frame 71.

Figure 6:
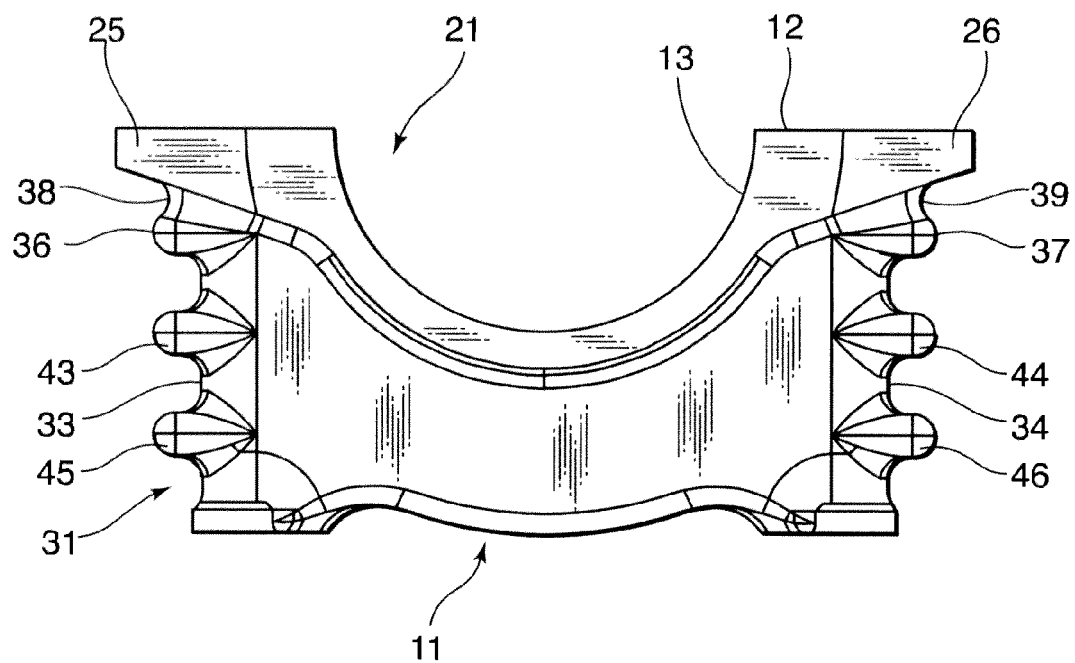
FIG. 6 is a front view of the bearing cap according to the second embodiment of this invention.
Figure 7:
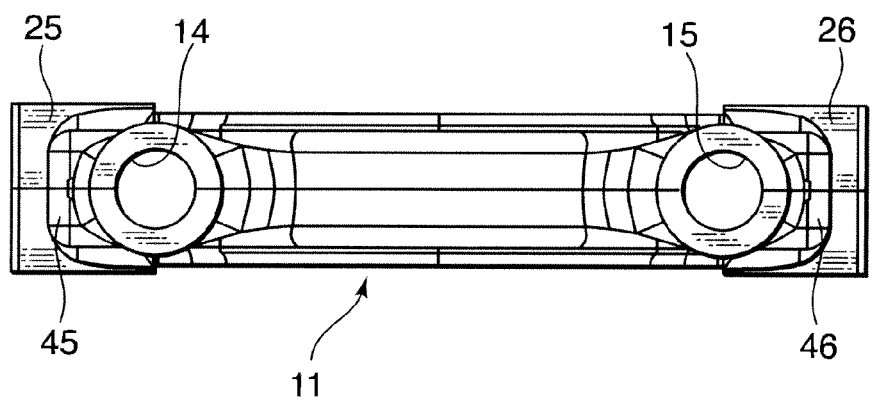
FIG. 7 is a plan view of the bearing cap according to the second embodiment of this invention when viewed from below.

Referring to FIGS. 6 and 7, the bearing cap 11 differs from the first embodiment in that the auxiliary reinforcing parts 81 and 82 are not provided. This is because the cap extending parts 72 and 73 joined to the left and right side surfaces 33 and 34 of the bearing cap 11 bring about a rigidity strengthening effect that is equivalent to or better than that of the auxiliary reinforcing parts 81 and 82.

Similar to the first embodiment, the bearing cap 11 according to this embodiment also comprises the protruding parts 25 and 26 that protrude largely from the side surfaces 33 and 34 in the horizontal direction and orthogonal to the crankshaft, or in other words in the right-left direction in FIG. 6, in the cylindrical area 21. Also, the reinforcing parts 36 and 37 are formed in the trapezoidal area 31 at positions on the top surface 19 side of the protruding parts 25 and 26. The protrusion length of the reinforcing parts 36 and 37 is set to be smaller than the protrusion length of the protruding parts 25 and 26.

In this embodiment, the shape of the reinforcing parts 36 and 37 is slightly different from that in the first embodiment. The difference will be explained later in detail.

The bearing cap 11 made of a ferrous material is thus cast into the ladder frame 71 made of an aluminum alloy in order to reduce the weight of the bearing cap assembly. In other words, it is possible to reduce the weight of the bearing cap assembly compared to a case in which the ladder frame 71 is formed from a ferrous material similar to the bearing cap 11.

When casting the bearing cap 11 into the ladder frame 71, if the joint surface between the bearing cap 11 made of a ferrous material and the cap extending parts 72 and 73 of the ladder frame 71 made of an aluminum alloy is a flat surface, it is difficult to retain the both in a closely adhered state. If the bearing cap 11 and the cap extending parts 72 and 73 are not in close contact, the rigidity of the bearing cap assembly decreases, and the bearing cap assembly cannot maintain sufficient strength.

In this embodiment, by providing the protruding parts 25 and 26 and the reinforcing parts 36 and 37, the close contact between the bearing cap 11 and the cap extending parts 72 and 73 is achieved. By achieving the close contact between the bearing cap 11 and the cap extending parts 72 and 73, the overall rigidity of the ladder frame 71 is strengthened.

A load in a rotation direction centered on the bearing hole 51 acts on the bearing cap 11 in accordance with a rotation of the crankshaft. Since the close contact between the bearing cap 11 and the cap extending parts 72 and 73 is strengthened by the protruding parts 25 and 26 and the reinforcing parts 36 and 37, it is possible to support the load in the rotation direction efficiently with the cap extending parts 72 and 73.

In order to retain the bearing cap 11 and the cap extending parts 72 and 73 in a closely contact state, the bearing cap 11 according to this embodiment comprises two projecting parts 43 and 45 formed on the side surface 33 below the reinforcing part 36. The projecting parts 43 and 45 project in the same direction as the reinforcing part 36 on the side surface 33. Similarly, the bearing cap 11 comprises two projecting parts 44 and 46 that project in the same direction as the reinforcing part 37 on the side surface 34 below the reinforcing part 37.

Preferably, the projecting parts 43 and 45 are formed into the same shape, and are positioned at equivalent intervals in the vertical direction from the reinforcing part 36. Similarly, the projecting parts 44 and 46 are also preferably formed in the same shape and are positioned at equivalent intervals in the vertical direction from the reinforcing part 37.

By arranging the bearing cap 11 in a casting mold before casting the ladder frame 71 using an aluminum alloy material, an integral bearing cap assembly is formed in a state in which the projecting parts 43 and 45 are wedged into the cap extending part 72 of the ladder frame 71 and the projecting parts 44 and 46 are wedged into the cap extending part 73 of the ladder frame 71. The projecting parts 43 and 45 which are wedged into the cap extending part 72 increase the contact surface area between the bearing cap 11 and the cap extending part 72, and the projecting parts 44 and 46 which are wedged into the cap extending part 73 increase the contact surface area between the bearing cap 11 and the cap extending part 73. As a result, the bearing cap 11 is firmly joined to the ladder frame 71.

In this embodiment, the reinforcing part 36 provided on the side surface 33 of the bearing cap 11 and the reinforcing part 37 provided on the side surface 34 of the bearing cap 11 are set to have different dimensions from those of the first embodiment. Basically, in this embodiment, the dimension of the reinforcing parts 36 and 37 in the vertical direction, or the up-down direction in FIG. 6, is set to be smaller than that of the reinforcing parts 36 and 37 of the first embodiment. Also, a recessed part 38 that is recessed in the horizontal direction is formed between the reinforcing part 36 and the protruding part 25, and a recessed part 39 that is recessed in the horizontal direction is formed between the reinforcing part 37 and the protruding part 26.

Further, in this embodiment, the shape formed by the reinforcing part 36 and the recessed part 38 is made similar to the projecting parts 43 and 45. Similarly, the shape formed by the reinforcing part 37 and the recessed part 39 is made similar to the projecting parts 44 and 46. The similarity of the shapes of the reinforcing parts 36 and 37 and the projecting parts 43 to 46 is preferable because it equalizes the close contact in the up-clown direction of FIG. 4 between the bearing cap 11 and the cap extending parts 72 and 73, which are two members formed of different materials.

On the other hand, if the dimension of the reinforcing parts 36 and 37 in the vertical direction, or the up-down direction in FIG. 6, is made smaller than that of the reinforcing parts 36 and 37 of the first embodiment, the rigidity of the bearing cap 11 decreases. However, considered as a bearing cap assembly, the decrease in the rigidity of the bearing cap 11 is compensated by the cap extending parts 72 and 73, and thus the rigidity as a bearing cap assembly does not decrease.

According to such a bearing cap assembly, the joint surface area between the bearing cap 11 made of a ferrous member and the cap extending parts 72 and 73 made of an aluminum alloy is enlarged, and the close contact between these two members formed of different materials is improved. As a result, in the bearing cap assembly comprising the bearing cap 11 made of a ferrous member and the ladder frame 71 made of an aluminum alloy into which the bearing cap 11 is cast, the close contact between the bearing cap 11 and the cap extending parts 72 and 73 is obtained and an overall high rigidity can be achieved.

Since the reinforcing parts 36 and 37 have approximately the same shape as the projecting parts 43 to 46 due to the recessed parts 38 and 39, the degree of close adherence in the vertical direction between the bearing cap 11 and the cap extending parts 72 and 73 can be equalized.

Further, since the reinforcing part 36 and the projecting parts 43 and 45 are disposed at approximately equivalent intervals in the up-down direction of FIG. 4 along the side surface 33 and the reinforcing part 37 and the projecting parts 44 and 46 are disposed at approximately equivalent intervals in the up-down direction of FIG. 4 along the side surface 34, the degree of close contact in the vertical direction between the bearing cap 11 and the cap extending parts 72 and 73 can be further equalized.

The recessed parts 38 and 39 increase the joint surface area between the bearing cap 11 and the cap extending parts 72 and 73. This increase in the joint surface area also contributes to improving the close contact between the bearing cap 11 and the cap extending parts 72 and 73, which are two members formed of different materials.

Referring to FIGS. 8 to 11, a third embodiment of this invention will be explained.

Figure 8:
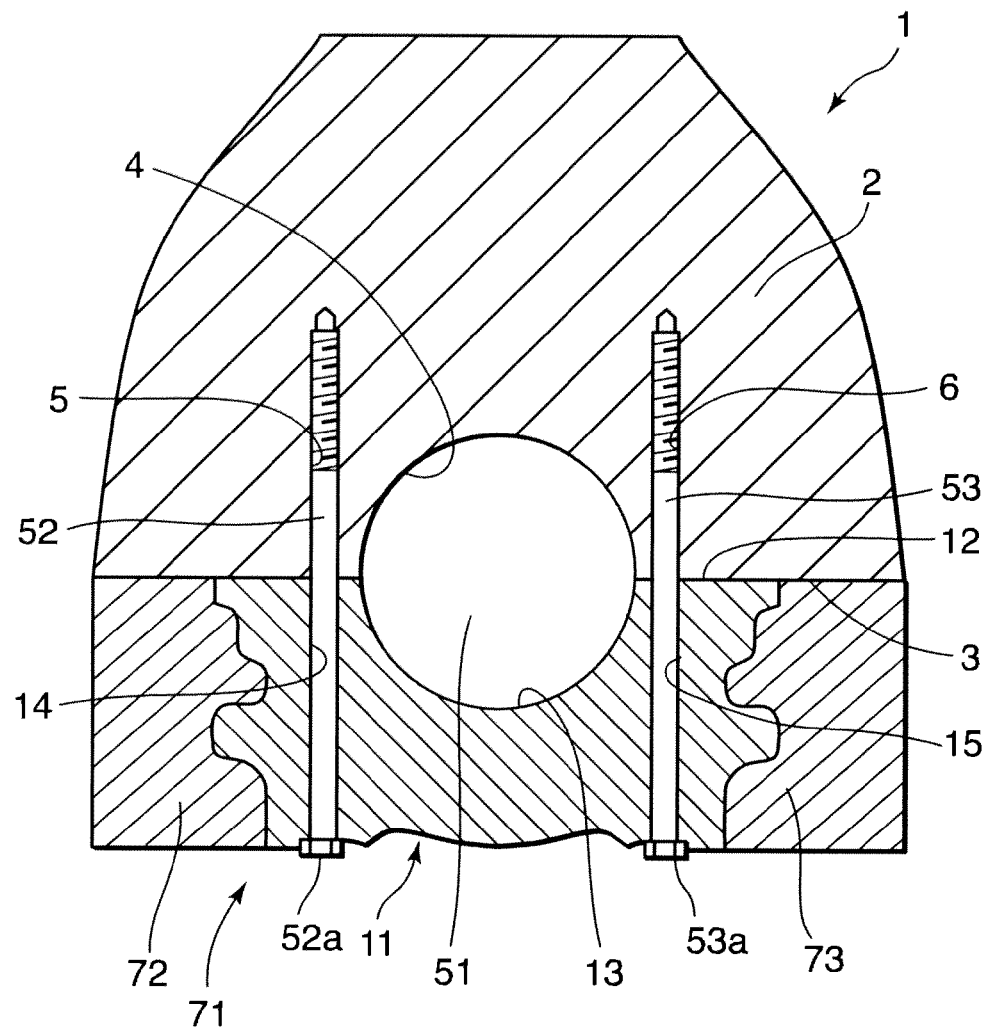
FIG. 8 is a schematic transverse cross-sectional view of a cylinder block of an internal combustion engine illustrating a bearing cap assembly according to a third embodiment of this invention in a state attached to a bulkhead.
Figure 9:
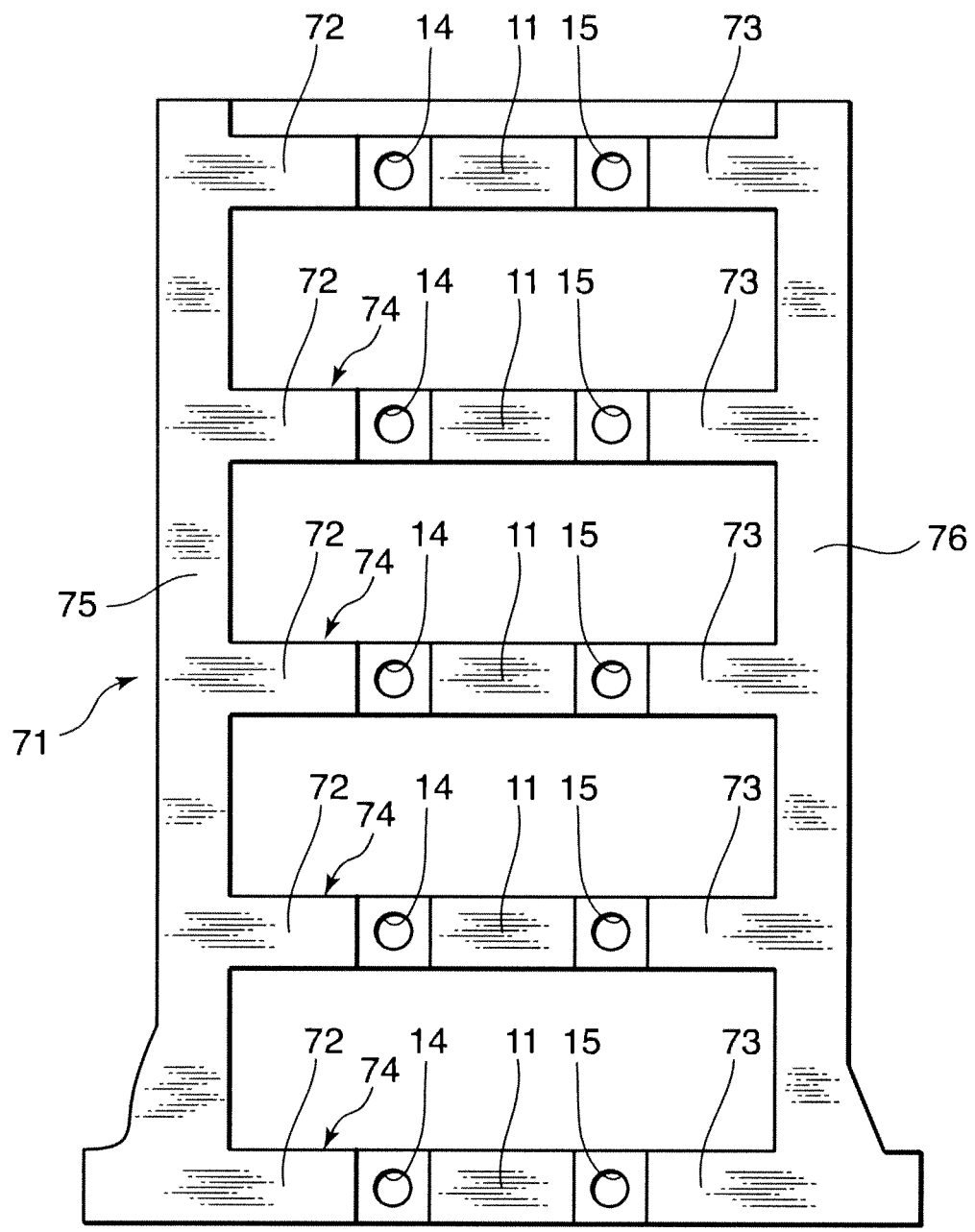
FIG. 9 is a plan view of the bearing cap assembly according to the third embodiment of this invention.

Referring to FIGS. 8 and 9, similar to the second embodiment, this embodiment is directed to a bearing cap assembly in which the bearing cap 11 made from a ferrous material is cast into the ladder frame 71 made from, for example, an aluminum alloy metal material that is lighter than the bearing cap 11 and has a lower melting point than that of the bearing cap 11.

Figure 10:
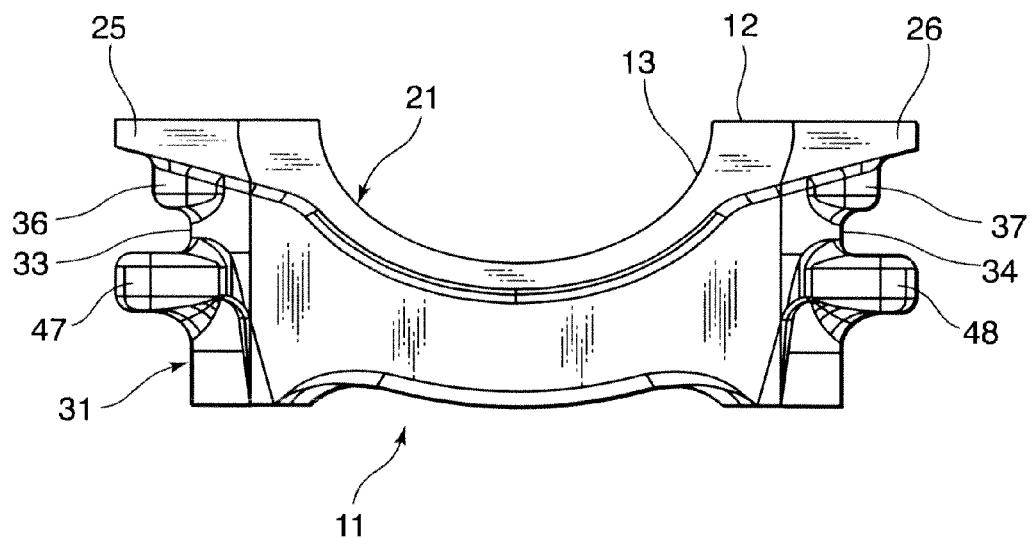
FIG. 10 is a front view of the bearing cap according to the third embodiment of this invention.
Figure 11:
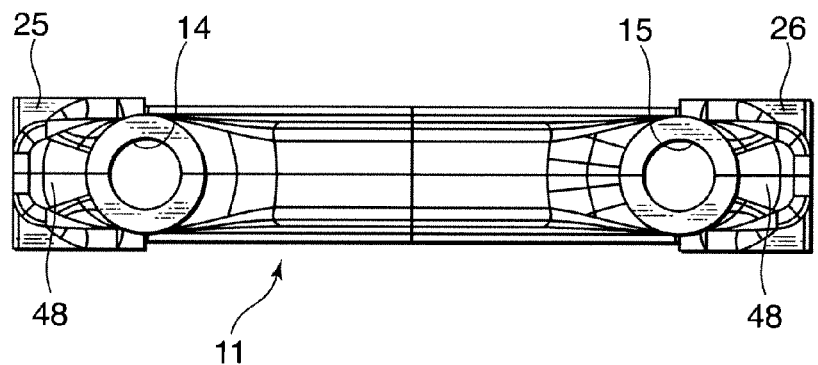
FIG. 11 is a plan view of the bearing cap according to the third embodiment of this invention when viewed from below.

Referring to FIGS. 10 and 11, the protruding parts 25 and 26 are provided to the bearing cap 11 similar to the first embodiment. Further, the reinforcing parts 36 and 37 are formed in the trapezoidal area 31 at positions on the top surface 19 side of the protruding parts 25 and 26. The reinforcing parts 36 and 37 protrude from the side surfaces 33 and 34 in the same direction as the protruding parts 25 and 26. The protrusion length of the reinforcing parts 36 and 37 is set to be smaller than the protrusion length of the protruding parts 25 and 26. Herein, the protrusion length means the amount of protrusion in the horizontal direction from the side surfaces 33 and 34. The reinforcing parts 36 and 37 function to increase the rigidity of the protruding parts 25 and 26.

However, in this embodiment, the length in the up-down direction of the reinforcing parts 36 and 37 is set to be shorter than that in the first embodiment. Also, the recessed parts 38 and 39 of the second embodiment are not fat med.

The hearing cap 11 according to this embodiment corresponds to a modification of the bearing cap 11 of the second embodiment. In this embodiment, a projecting part 47 that projects toward the outside in the horizontal direction is provided on the side surface 33 of the bearing cap 11. A projecting part 48 is provided on the side surface 34 of the bearing cap 11. By limiting the projecting parts 47 and 48 provided to the side surfaces 33 and 34 to one on each side, the structure of the bearing cap 11 is simplified compared to the second embodiment.

In order to secure the joint surface area between the bearing cap 11 and the extending parts 72 and 73 with the one projecting part 47 and the one projecting part 48, the projecting parts 47 and 48 project toward the outside in the horizontal direction farther than the reinforcing parts 36 and 37. In other words, the protrusion length of the projecting parts 47 and 48 is set to be greater than that of the reinforcing parts 36 and 37. The projecting parts 47 and 48 are preferably provided in the center in the up-down direction of the bearing cap 11. This is because if the projecting parts 47 and 48 are provided at a position shifted above or below the center, the degree of close contact between the bearing cap 11 and the cap extending parts 72 and 73 may deviate in the up-down direction.

The reinforcing parts 36 and 37 that protrude by a small amount toward the outside in the horizontal direction contribute somewhat to increasing the joint surface area between the bearing cap 11 and the cap extending parts 72 and 73. Considering this contribution, arranging the projecting parts 47 and 48 slightly below the center in the up-down direction of the bearing cap 11 is preferable because it equalizes the degree of close contact in the up-down direction between the bearing cap 11 and the cap extending parts 72 and 73.

The operational effects achieved by the second embodiment are also achieved by this embodiment.

In this embodiment, since only one projecting part 47 and only one projecting part 48 are respectively provided to each of the side surfaces 33 and 34 of the bearing cap 11, the manufacturing of the bearing cap 11 is simplified compared to the second embodiment in which a plurality of projecting parts 43 to 46 are provided to the side surfaces 33 and 34.

Figure 12:
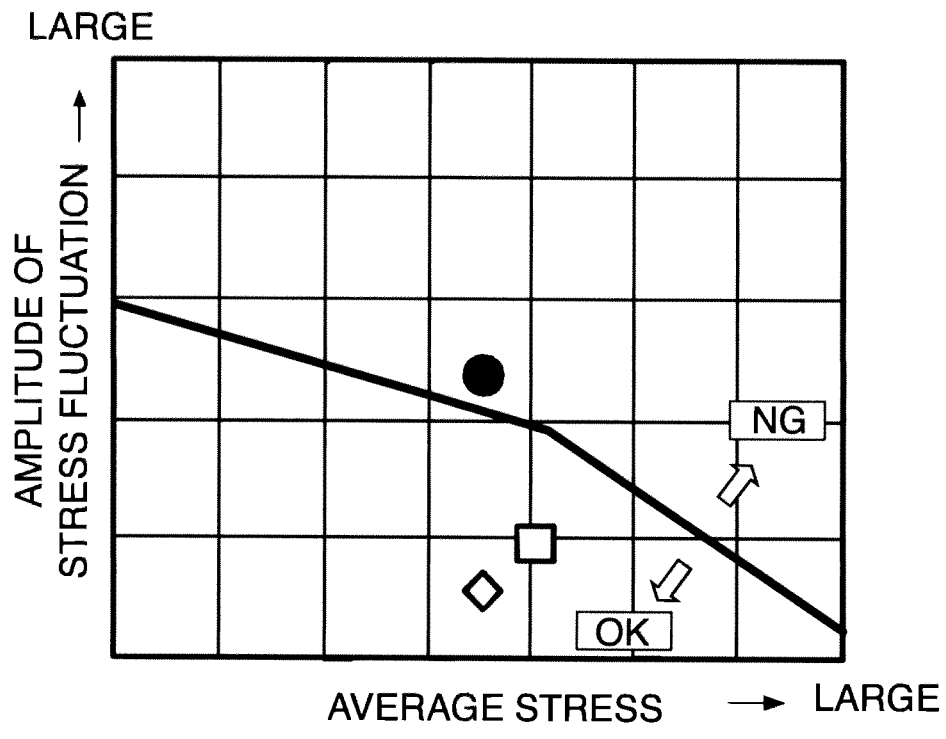
FIG. 12 is a diagram comparing a stress on a joint surface of the bearing cap in the bearing cap assemblies according to the second and third embodiments of this invention and a stress on a joint surface in a conventional bearing cap structure.

Referring to FIG. 12, the bearing cap assemblies according to the second embodiment and the third embodiment are compared to a conventional bearing cap structure with regard to the stress on the joint surface between the bearing cap and the bulkhead.

During operation of the internal combustion engine, a stress by tightening the bolts 52 and 53 occurs on the joint surface 12 of the bearing cap 11 with the bulkhead 2. In addition, thermal stress and residual stress also occurs thereon. The "AVERAGE STRESS" on the abscissa in the diagram of FIG. 12 denotes an average stress of the sum of these stresses occurring on the joint surface 12 during operation of the internal combustion engine.

During operation of a four-stroke cycle engine, a stress occurring on the joint surface 12 fluctuates in an approximate sine curve. The "AMPLITUDE OF STRESS FLUCTUATION" on the ordinate of the diagram corresponds to a mid-value of the amplitude of the fluctuating stress.

The line that inclines toward the right in the diagram represents a boundary line at which the durability of the cylinder block 1 can be maintained. Basically, if the operating state of the internal combustion engine is on the upper side of the boundary line, the durability of the cylinder block 1 cannot be maintained. The region marked with "NG" in the diagram corresponds to this condition. If the operating state of the internal combustion engine is on the lower side of the boundary line, the durability of the cylinder block can be maintained. The region marked with "OK" in the diagram corresponds to this condition.

In an internal combustion engine with a conventional bearing cap, even if the operating state is on the upper side of the boundary line as indicated by the black circle, it can be anticipated that the operating state will move to the lower side of the boundary line as indicated by the square and diamond by utilizing the bearing cap assembly according to the second or third embodiment of this invention. Shortly, this invention increases the durability of the cylinder block 1.

The contents of Tokugan 2010-290315, with a filing date of Dec. 27, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

In the second and third embodiments explained above, the bearing cap assembly is fowled by casting the bearing cap 11 into a bearing cap retaining member made of a metal material that is lighter than the bearing cap 11 and has a lower melting point than that of the hearing cap 11. The bearing cap retaining member is constituted by the ladder frame 71 having the plurality of crossbar members 74 and the beam members 75 and 76 to which both ends of the crossbar members are joined. The crossbar members 74 are constituted by the cap extending parts 72 and 73 and the bearing cap 11 that is cast therebetween.

However, the bearing cap retaining member is not limited to the ladder frame 71, and various constitutions are possible. For example, it is possible to use a single crossbar member 74 into which the bearing cap 11 is cast between the cap extending parts 72 and 73 as the bearing cap retaining member. The crossbar member 74 is then fixed to each bulkhead 2.

INDUSTRIAL FIELD OF APPLICATION

As described above, the bearing cap and bearing cap assembly according to this invention reduce the stress on a joint portion between a bulkhead and a bearing cap in an internal combustion engine, and hence improve the durability of an automobile engine.

The invention claimed is:

1. A bearing cap fixed to a bulkhead of a cylinder block by bolts and supporting a crankshaft so as to be free to rotate, comprising:
   a joint surface with the bulkhead;
   a top surface located on an opposite side of the joint surface;
   a pair of side surfaces connecting the joint surface and the top surface;
   a pair of protruding parts that protrude respectively from the pair of side surfaces to enlarge the joint surface in a transverse direction of the crankshaft;
   a pair of reinforcing parts located between the pair of protruding parts and the top surface, the pair of reinforcing parts protruding from the pair of side surfaces in the transverse direction of the crankshaft and having a protrusion length that is smaller than a protrusion length of the pair of protruding parts, and
   a pair of rounded portions formed between the pair of protruding parts and the pair of reinforcing parts, the pair of rounded portions protruding from the pair of side surfaces in the transverse direction of the crankshaft and having a protrusion length that is smaller than the protrusion length of the pair of protruding parts and greater than the protrusion length of the pair of reinforcing parts,
   wherein the pair of side surfaces, the pair of protruding parts, the pair of rounded portions, and the pair of reinforcing parts are all formed on the outside of the bolts, the pair of reinforcing parts are symmetrical with respect to a center axis of the bearing cap, and the pair of reinforcing parts, the pair of rounded portions, and the pair of protruding parts are formed integrally with the bearing cap, such that a first reinforcing part of the pair of reinforcing parts, a first rounded portion of the pair of rounded portions, and a first protruding part of the pair of protruding parts are formed on a first side surface of the pair of side surfaces adjacent to each other, and a second reinforcing part of the pair of reinforcing parts, a second rounded portion of the pair of rounded portions, and a second protruding part of the pair of protruding parts are formed on a second side surface of the pair of side surfaces adjacent to each other.

2. The bearing cap as defined in claim 1, further comprising a pair of projecting parts that are provided independently from the pair of reinforcing parts between the top surface and the pair of reinforcing parts, wherein the pair of projecting parts protrude respectively from the pair of side surfaces in the transverse direction of the crankshaft and have a protrusion length that is smaller than the protrusion length of the pair of protruding parts.

3. The bearing cap as defined in claim 2, wherein the pair of projecting parts are provided in a center of the pair of side surfaces of the bearing cap.

4. The bearing cap as defined in claim 1, further comprising a plurality of pairs of projecting parts that are provided independently from the pair of reinforcing parts and arranged at equivalent intervals between the top surface and the pair of reinforcing parts, wherein the plurality of pairs of projecting parts protrude respectively from the pair of side surfaces in the transverse direction of the crankshaft and have a protrusion length that is smaller than the protrusion length of the pair of protruding parts.

5. The bearing cap as defined in claim 1, wherein a length of the pair of protruding parts in an axial direction of the crankshaft and a length of the reinforcing parts of the bearing cap in the axial direction of the crankshaft are equal.

6. A bearing cap fixed to a bulkhead of a cylinder block by bolts and supporting a crankshaft so as to be free to rotate, comprising:
   a joint surface with the bulkhead;
   a top surface located on an opposite side of the joint surface;
   a pair of side surfaces connecting the joint surface and the top surface;
   a pair of protruding parts that protrude respectively from the pair of side surfaces to enlarge the joint surface in a transverse direction of the crankshaft; and
   a pair of reinforcing parts located between the pair of protruding parts and the top surface, the pair of reinforcing parts protruding from the pair of side surfaces in the transverse direction of the crankshaft and having a protrusion length that is smaller than a protrusion length of the pair of protruding parts,
   wherein the pair of side surfaces, the pair of protruding parts, and the pair of reinforcing parts are all formed on the outside of the bolts, the pair of reinforcing parts are symmetrical with respect to a center axis of the bearing cap, and the pair of reinforcing parts and the pair of protruding parts are formed integrally with the bearing cap, such that a first reinforcing part of the pair of reinforcing parts and a first protruding part of the pair of protruding parts are formed on a first side surface of the pair of side surfaces adjacent to each other, and a second reinforcing part of the pair of reinforcing parts and a second protruding part of the pair of protruding parts are formed on a second side surface of the pair of side surfaces adjacent to each other, and
   wherein the bearing cap further comprises a pair of projecting parts that are provided independently from the pair of reinforcing parts between the top surface and the pair of reinforcing parts, wherein the pair of projecting parts protrude respectively from the pair of side surfaces in the transverse direction of the crankshaft and have a protrusion length that is smaller than the protrusion length of the pair of protruding parts, and each of the pair of reinforcing parts comprises a recessed part.

7. A bearing cap assembly that is fixed to a bulkhead of a cylinder block by bolts and supporting a crankshaft so as to be free to rotate, comprising:
   a bearing cap that comprises:
      a joint surface with the bulkhead;
      a top surface positioned on an opposite side of the joint surface;
      a pair of side surfaces that connect the joint surface and the top surface;
      a pair of protruding parts that protrude respectively from the pair of side surfaces to enlarge the joint surface in a transverse direction of the crankshaft; and
      a pair of reinforcing parts located between the top surface and the pair of protruding parts, the pair of reinforcing parts protruding from the pair of side surfaces in the transverse direction of the crankshaft and having a protrusion length that is smaller than a protrusion length of the pair of protruding parts;
   a pair of rounded portions formed between the pair of protruding parts and the pair of reinforcing parts, the pair of rounded portions protruding from the pair of side surfaces in the transverse direction of the crankshaft and having a protrusion length that is smaller than the protrusion length of the pair of protruding parts and greater than the protrusion length of the pair of reinforcing parts, and a bearing cap retaining member made of a metal material that is lighter than the bearing cap and has a melting point lower than a melting point of the bearing cap, wherein the pair of side surfaces, the pair of protruding parts, the pair of rounded portions, and the pair of reinforcing parts are all formed on the outside of the bolts, the pair of reinforcing parts are symmetrical with respect to a center axis of the bearing cap, and the pair of reinforcing parts, the pair of rounded portions, and the pair of protruding parts are formed integrally with the bearing cap, such that a first reinforcing part of the pair of reinforcing parts, a first rounded portion of the pair of rounded portions, and a first protruding part of the pair of protruding parts are formed on a first side surface of the pair of side surfaces adjacent to each other, and a second reinforcing part of the pair of reinforcing parts, a second rounded portion of the pair of rounded portions, and a second protruding part of the pair of protruding parts are formed on a second side surface of the pair of side surfaces adjacent to each other.

8. The bearing cap assembly as defined in claim 7, wherein a plurality of the bearing caps are arranged at intervals in an axial direction of the crankshaft; and the bearing cap retaining member comprises a ladder frame having crossbar members joined respectively to the bearing caps and protrude respectively therefrom toward both sides in the transverse direction of the crankshaft, and a pair of beam members that extend in the axial direction of the crankshaft and join distal ends of the crossbar members that protrude in the same direction.

* * * * *